United States Patent
Shiozaki et al.

(10) Patent No.: US 7,035,551 B2
(45) Date of Patent: Apr. 25, 2006

(54) OPTICAL TRANSMITTER

(75) Inventors: Toru Shiozaki, Kobe (JP); Masaru Fuse, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 649 days.

(21) Appl. No.: 10/378,925

(22) Filed: Mar. 5, 2003

(65) Prior Publication Data
US 2003/0170034 A1 Sep. 11, 2003

(30) Foreign Application Priority Data
Mar. 6, 2002 (JP) .............................. 2002-060396

(51) Int. Cl.
*H04B 10/04* (2006.01)
(52) U.S. Cl. ....................... 398/182; 398/192
(58) Field of Classification Search ........ 398/140–201, 398/52–54, 66–73, 98; 357/237–325; 372/26–37
See application file for complete search history.

(56) References Cited
U.S. PATENT DOCUMENTS
2001/0038482 A1 * 11/2001 Uehara ....................... 359/161

2004/0131366 A1 * 7/2004 Tsushima et al. ........... 398/197

* cited by examiner

Primary Examiner—Jason Chan
Assistant Examiner—David Lee
(74) Attorney, Agent, or Firm—Wenderoth, Lind & Ponack, L.L.P.

(57) ABSTRACT

A data unit 1010 outputs an information signal to be transmitted in the form of optical packets, as well as wavelength information representing a wavelength of each optical packet. A first modulating signal processing unit 1051 receives an information signal, and inserts an electric signal ("dummy signal") in any no-data period during which the information signal is absent, and outputs the resultant signal as a modulating signal. The dummy signal has the same amplitude as that of the information signal. A wavelength information processing unit 1021 outputs a wavelength controlling current corresponding to the wavelength information, and in any no-data period, outputs a wavelength controlling current corresponding to a wavelength which is different from the wavelengths represented by the wavelength information. A wavelength-tunable light source 1030 outputs light of a wavelength corresponding to the wavelength controlling current. An optical modulation unit 1040 modulates the light outputted from the wavelength-tunable light source 1030 with the modulating signal, and outputs the modulated signal as optical packets. As a result, an optical surge is prevented from occurring at the time of amplifying intermittently generated optical packets.

8 Claims, 8 Drawing Sheets

OPTICAL TRANSMITTER

BACKGROUND OF THE INVENTION

1. Field of the Invention

The present invention relates to an optical transmitter, and more particularly to an optical transmitter which transmits an information signal to be transmitted in the form of a burst signal (e.g., optical packets).

2. Description of the Background Art

Figure 7:
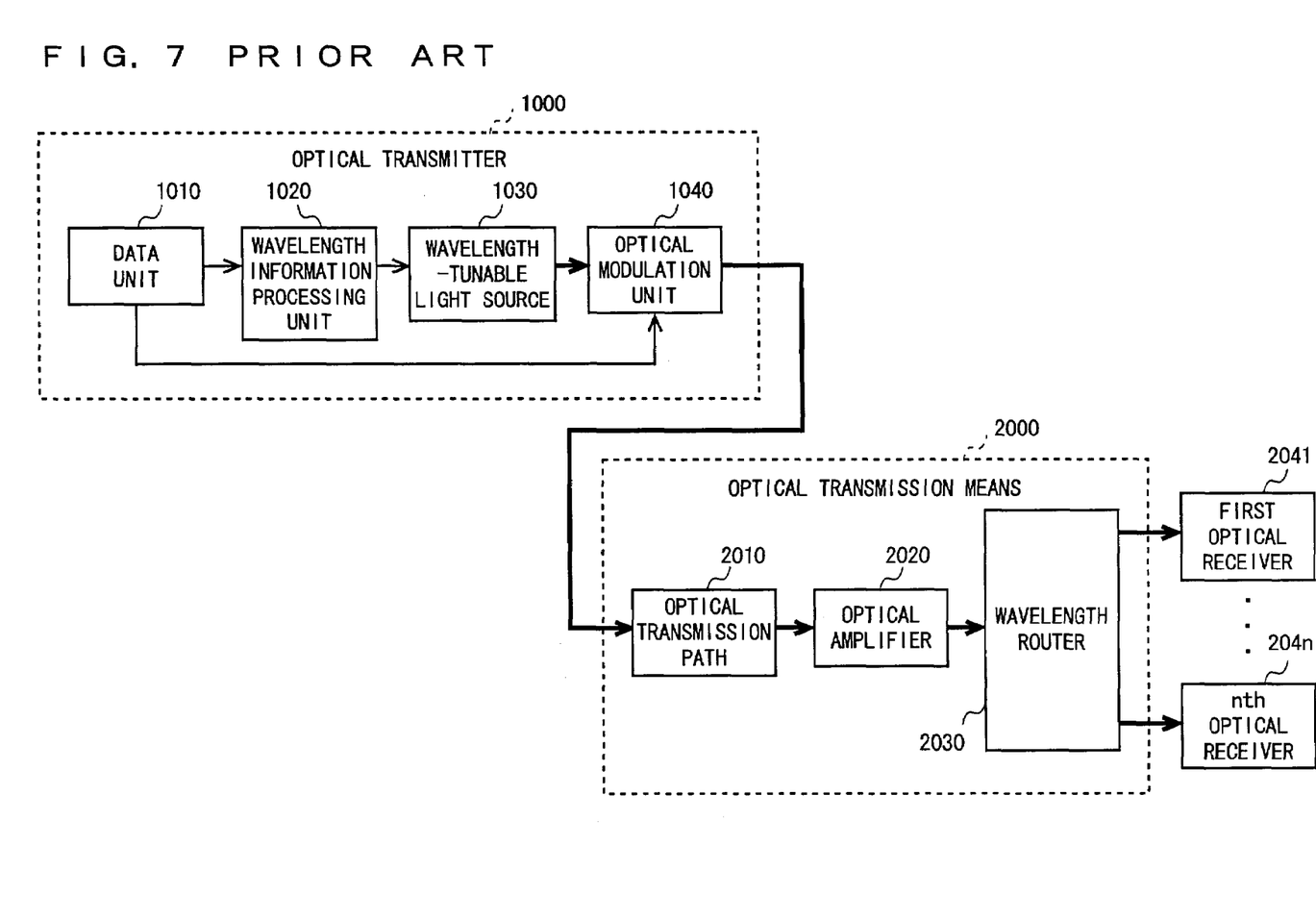
FIG. 7 is a block diagram illustrating the structure of a conventional optical transmission system.

FIG. 7 is a block diagram illustrating the structure of an optical transmission system including a conventional optical transmitter, in which a wavelength-tunable light source is controlled, by varying a wavelength controlling current applied thereto, so as to output light packets of different wavelengths in a time-divided manner (so that the wavelength will be different from optical packet to optical packet). Hereinafter, this conventional optical transmission system will be described with reference to FIG. 7.

In FIG. 7, the conventional optical transmission system comprises an optical transmitter 1000, an optical transmission means 2000, and optical receivers 2041 to 204n. The optical transmitter 1000 includes a data unit 1010, a wavelength information processing unit 1020, a wavelength-tunable light source 1030, and an optical modulation unit 1040. The optical transmission means 2000 includes an optical transmission path 2010, an optical amplifier 2020, and a wavelength router 2030.

In the optical transmission system having the above structure, the data unit 1010 outputs an information signal, which is to be transmitted in the form of optical packets, and wavelength information representing a wavelength of each optical packet. In accordance with the wavelength information outputted from the data unit 1010, the wavelength information processing unit 1020 applies a predetermined wavelength controlling current to the wavelength-tunable light source 1030, with respect to each optical packet. As a result, the wavelength-tunable light source 1030 outputs light having a wavelength corresponding to the wavelength controlling current outputted from the wavelength information processing unit 1020. The optical modulation unit 1040 modulates the light outputted from the wavelength-tunable light source 1030 with the information signal outputted from the data unit 1010. Thus, optical packets are generated and outputted.

The optical amplifier 2020 amplifies the optical packets which have been outputted from the optical modulation unit 1040 and transmitted over the optical transmission path 2010. The wavelength router 2030 includes a plurality of output ports, and depending on the wavelengths of the optical packets which have been outputted from the optical amplifier 2020, separately outputs the optical packets through different output ports. The optical receivers 2041 to 204n, which are provided respectively corresponding to the plurality of output ports of the wavelength router 2030, convert the optical packets outputted from the wavelength router 2030 into electric signals (information signals). The optical amplifier 2020 may alternatively be inserted between the wavelength router 2030 and the optical receivers 2041 to 204n.

Figure 8:
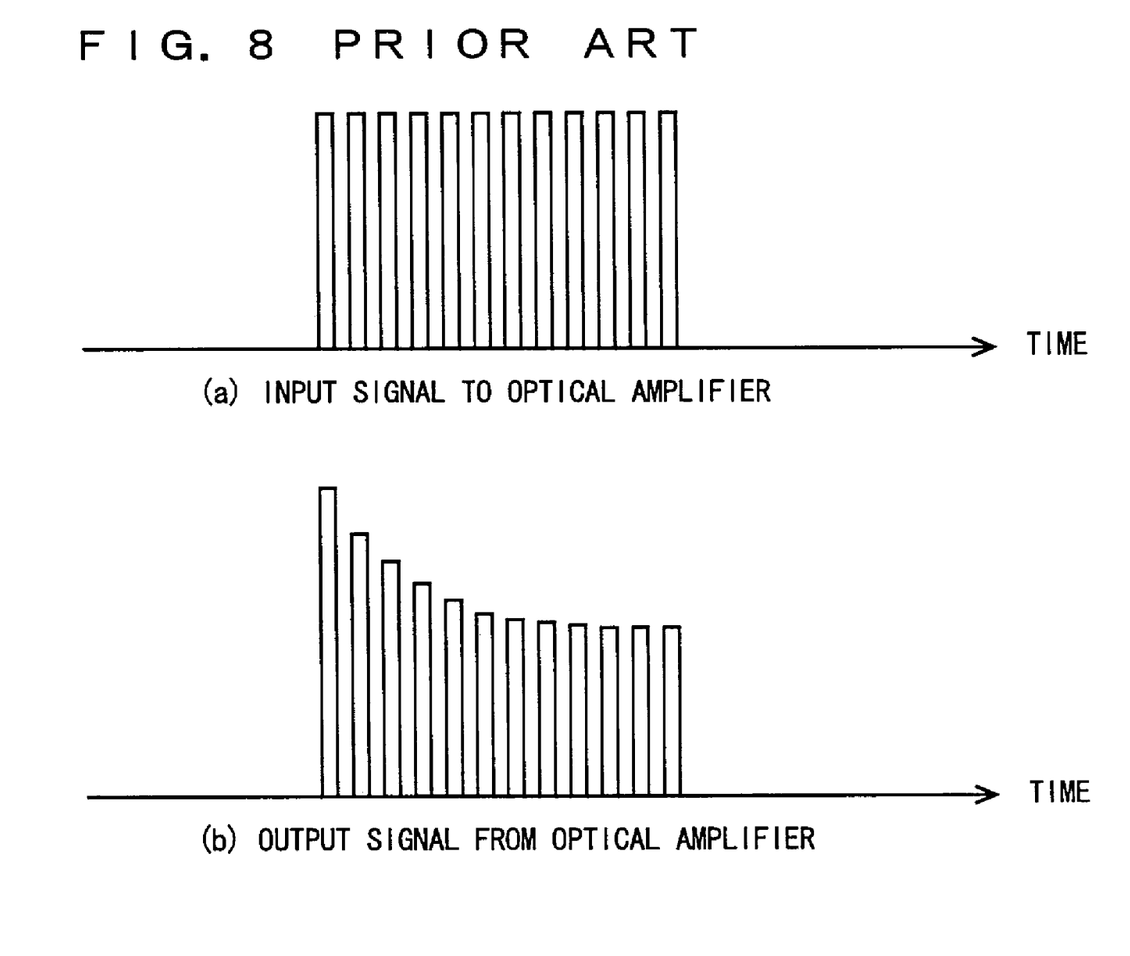
FIG. 8 is a diagram illustrating how an optical surge, or a temporal fluctuation in the optical signal level, may occur in an optical amplifier of a conventional optical transmission system.

However, in accordance with the above-described conventional optical transmission system, if an intermittent optical signal (optical packets) as shown in (a) of FIG. 8 is inputted to the optical amplifier 2020, the output optical signal from the optical amplifier 2020 will experience an instantaneous increase inthe optical signal level (known as an "optical surge"), thereby causing a waveform degradation as illustrated in (b) of FIG. 8. An optical surge is known to occur due to transient response characteristics which exist, when an optical signal is inputted after a long no-data period, for reasons associated with the physiological properties and/or construction of the optical amplifier 2020, e.g., its relaxation time constant. If the optical signal has such a level fluctuation over time, the optimum identification level at each optical receiver will also fluctuate with the level fluctuation. As a result, there is a problem in that in a structure where data is to be identified at an optical receiver against a prefixed identification level, it is difficult to constantly obtain optimum transmission characteristics.

SUMMARY OF THE INVENTION

Therefore, an object of the present invention is to provide an optical transmitter which, when a burst signal such as intermittently generated optical packets is to be transmitted, is capable of transmitting an optical signal in a manner to prevent an optical surge after the optical signal is led through an optical amplifier.

The present invention has the following features to attain the object mentioned above.

A first aspect of the present invention is directed to an optical transmitter for transmitting an information signal as a burst signal, comprising: a data unit for outputting the information signal and wavelength information representing a wavelength corresponding to the information signal; a modulating signal processing unit for receiving the information signal and outputting a modulating signal, the modulating signal comprising the information signal and a predetermined electric signal inserted in no-data periods, wherein the no-data periods are periods during which the information signal is absent; a wavelength information processing unit for receiving the wavelength information and outputting a wavelength controlling current, wherein the wavelength controlling current corresponds to the wavelength while the information signal is present, and corresponds to a predetermined wavelength during the no-data periods; a wavelength-tunable light source for outputting light whose wavelength corresponds to the wavelength controlling current; and an optical modulation unit for modulating the light outputted from the wavelength-tunable light source with the modulating signal.

Thus, according to the first aspect, the modulating signal processing unit inserts a predetermined electric signal in no-data periods, thereby making it possible to control an optical output power of the optical modulation unit. As a result, an optical surge can be prevented from occurring when an output optical signal is transmitted through an optical transmission means which includes an optical amplifier.

In a second aspect based on the first aspect, the predetermined electric signal inserted in the no-data periods by the modulating signal processing unit has an amplitude which is equal to an amplitude of the information signal outputted from the data unit.

Thus, according to the second aspect, the modulating signal processing unit inserts in the no-data periods an electric signal having an amplitude equal to that of the information signal. As a result, a constant optical output power from the optical modulation unit is obtained, and an optical surge is prevented from occurring at the time of amplifying the transmitted optical signal in an optical amplifier.

In a third aspect based on the first aspect, the predetermined electric signal inserted in the no-data periods by the modulating signal processing unit has an average electrical power which is equal to an average electrical power of the information signal outputted from the data unit.

Thus, according to the third aspect, the modulating signal processing unit inserts in the no-data periods an electric signal having an average electrical power equal to that of the information signal. As a result, a constant optical output power from the optical modulation unit is obtained, and an optical surge is prevented from occurring at the time of amplifying the transmitted optical signal in an optical amplifier.

In a fourth aspect based on the first aspect, the modulating signal processing unit multiplexes the information signal outputted from the data unit with a signal whose waveform is inverse to an envelope of the information signal.

Thus, according to the fourth aspect, the modulating signal processing unit multiplexes the information signal with a signal whose waveform is inverse to an envelope of the information signal. As a result, a constant optical output power from the optical modulation unit is obtained, and an optical surge is prevented from occurring at the time of amplifying the transmitted optical signal in an optical amplifier.

In a fifth aspect based on the first aspect, the predetermined wavelength is different from the wavelength corresponding to the information signal.

Thus, according to the fifth aspect, the optical wavelength of the predetermined electric signal which is inserted in the no-data periods is made different from the wavelength corresponding to the information signal. As a result, an optical surge is prevented from occurring at the time of amplifying the transmitted optical signal in an optical amplifier, without affecting the information signal.

In a sixth aspect based on the first aspect, the modulating signal processing unit controls an amplitude of the predetermined electric signal inserted in the no-data periods so that a constant input optical power is obtained at an optical amplifier which receives the information signal.

Thus, according to the sixth aspect, the modulating signal processing unit controls the amplitude of the predetermined electric signal inserted in the no-data periods so that a constant input optical power is obtained at an optical amplifier. As a result, an optical surge can be effectively prevented from occurring at an optical amplifier.

In a seventh aspect based on the first aspect, the modulating signal processing unit controls an average electrical power of the predetermined electric signal inserted in the no-data periods so that a constant input optical power is obtained at an optical amplifier which receives the information signal.

Thus, according to the seventh aspect, the modulating signal processing unit controls the average electrical power of the predetermined electric signal to be inserted in the no-data periods. As a result, a constant input optical power is obtained at an optical amplifier, and an optical surge can be effectively prevented from occurring at the optical amplifier.

In an eighth aspect based on the first aspect, the optical transmitter further comprises a memory unit storing wavelength dependence of losses in an optical transmission path extending from the optical transmitter to an optical amplifier which receives the information signal, wherein, based on the information stored in the memory unit, the modulating signal processing unit controls the predetermined electric signal inserted in the no-data periods so that a constant input optical power is obtained at the optical amplifier.

Thus, according to the eighth aspect, wavelength dependence of losses in the optical transmission path is present in a memory unit. As a result, a constant input optical power is obtained at an optical amplifier while taking into consideration the loss on the optical transmission path, and an optical surge can be effectively prevented from occurring at the optical amplifier.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, various embodiments of the present invention will be described with reference to the accompanying figures.

First Embodiment

Figure 1:
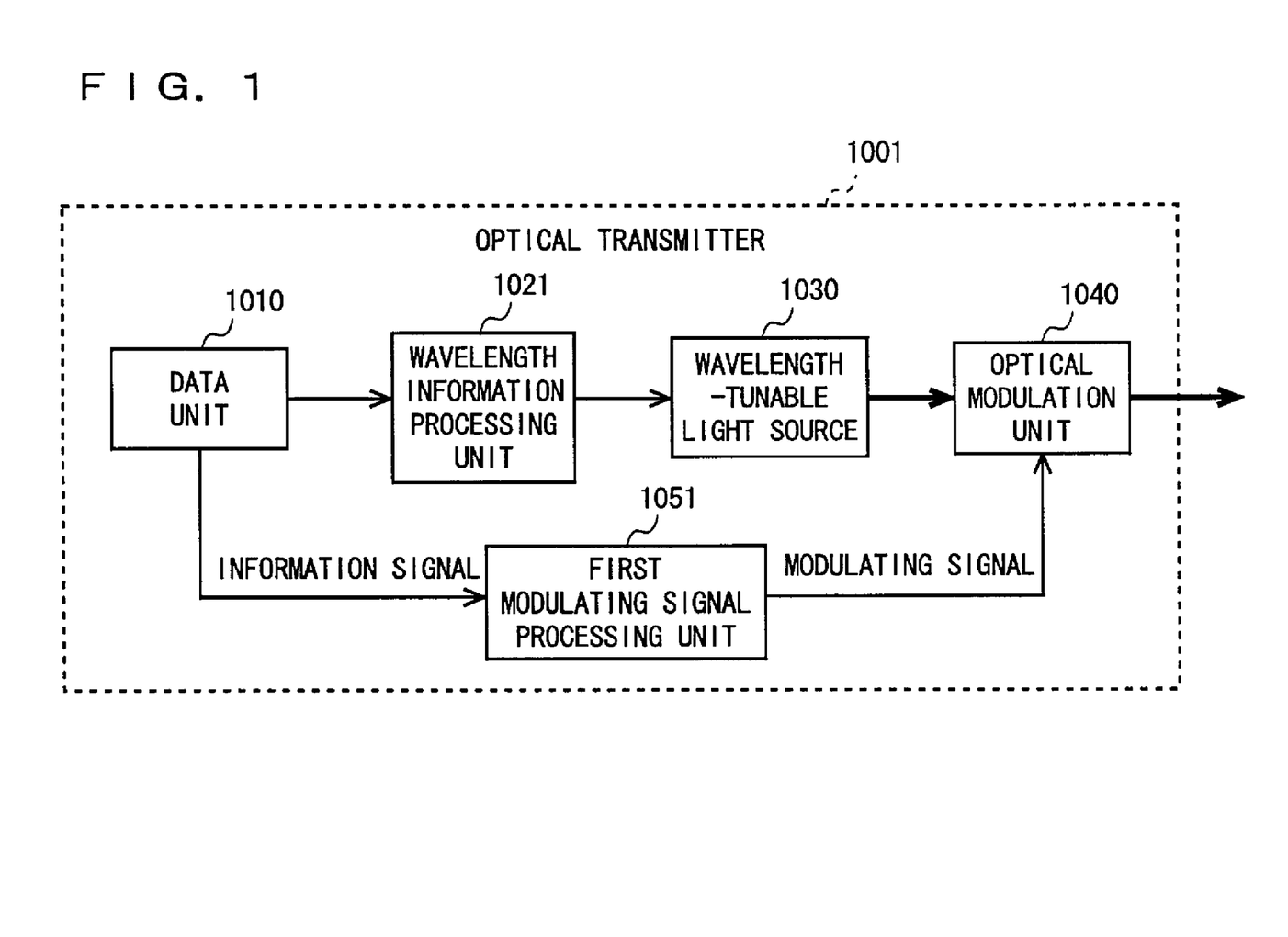
FIG. 1 is a block diagram illustrating the structure of an optical transmitter according to a first embodiment of the present invention.

FIG. 1 is a block diagram illustrating the structure of an optical transmitter 1001 according to a first embodiment of the present invention. In FIG. 1, the optical transmitter 1001 comprises a data unit 1010, a wavelength information processing unit 1021, a wavelength-tunable light source 1030, an optical modulation unit 1040, and a first modulating signal processing unit 1051.

Figure 2:
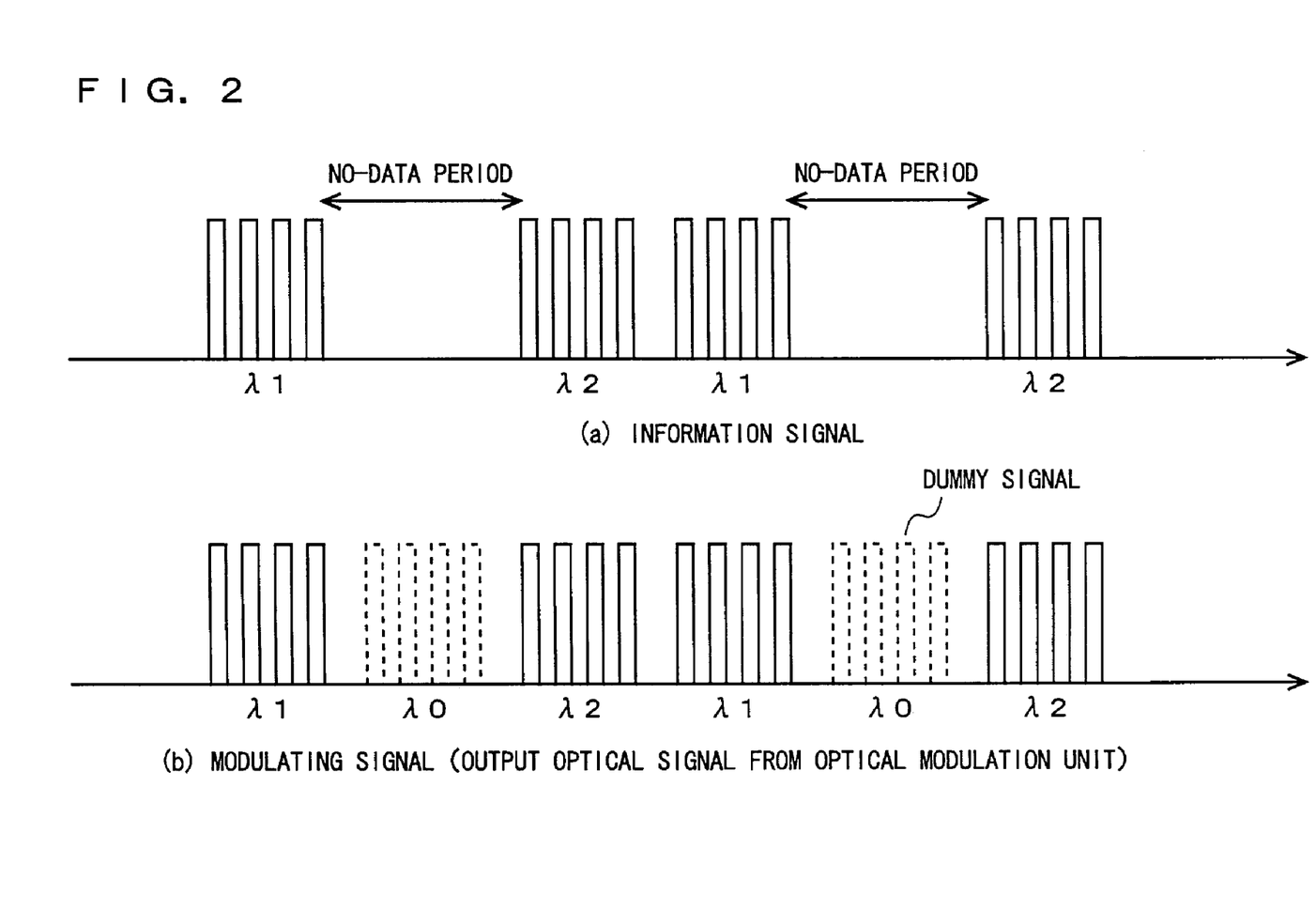
FIG. 2 is a diagram illustrating an information signal and a modulating signal according to the first embodiment of the present invention.

In (a) of FIG. 2 is shown an information signal which is supplied from the data unit 1010 to the first modulating signal processing unit 1051. In (b) of FIG. 2 is shown a modulating signal which is outputted from the first modulating signal processing unit 1051 and applied to the optical modulation unit 1040. Note that the output optical signal from the optical modulation unit 1040 will have the same waveform as that shown in (b) of FIG. 2. Hereinafter, the operation of the optical transmitter 1001 will be described with reference to FIGS. 1 and 2.

The data unit 1010 outputs an information signal, which is to be transmitted in the form of optical packets, and wavelength information representing a wavelength of each optical packet. The first modulating signal processing unit 1051 receives the information signal outputted from the data unit 1010, and, as shown in (b) of FIG. 2, inserts an electric signal (hereinafter referred to as a "dummy signal") in any "no-data period", i.e., a period during which the information signal is absent, and outputs the resultant signal as a modulating signal. The dummy signal has the same amplitude as that of the information signal. The wavelength information processing unit 1021 outputs a wavelength controlling current corresponding to the wavelength information outputted from the data unit 1010. Moreover, in any no-data period, the wavelength information processing unit 1021 also outputs, as shown in (b) of FIG. 2, a wavelength controlling current corresponding to a wavelength ($\lambda 0$) which is different from the wavelengths ($\lambda 1$, $\lambda 2$) represented by the wavelength information out putted from the data unit 1010. In accordance with the wavelength controlling current outputted from the wavelength information processing unit 1021, the wavelength-tunable light source 1030 outputs light of a corresponding wavelength. The optical modulation unit 1040 modulates the light outputted from the wavelength-tunable light source 1030 with the modulating signal outputted from the first modulating signal processing unit 1051, and outputs the modulated signal in the form of optical packets.

Although the present embodiment illustrates for conciseness a case where the information signal is transmitted by employing two wavelengths ($\lambda 1$, $\lambda 2$), the present invention is also applicable in the case where the information signal is transmitted by employing one wavelength, or three or more wavelengths; the same is also true of the second and third embodiments described below.

Thus, there is provided an optical transmitter in which a wavelength-tunable light source is controlled, by varying a wavelength controlling current applied thereto, so as to output light packets of different wavelengths in a time-divided manner (so that the wavelength will be different from optical packet to optical packet). In the optical transmitter according to the present embodiment, an electric signal having the same amplitude as that of the information signal is inserted in any no-data period, the optical wavelength for the no-data period being selected to be a wavelength different from the wavelengths of all of the optical packets to be transmitted. As a result, it becomes possible to obtain a constant optical output power from the optical modulation unit, without affecting the information signal to be transmitted in the form of optical packets. Therefore, an optical surge can be prevented from occurring when an output optical signal from the optical modulation unit 1040 is transmitted through an optical transmission means which includes an optical amplifier.

Second Embodiment

Figure 3:
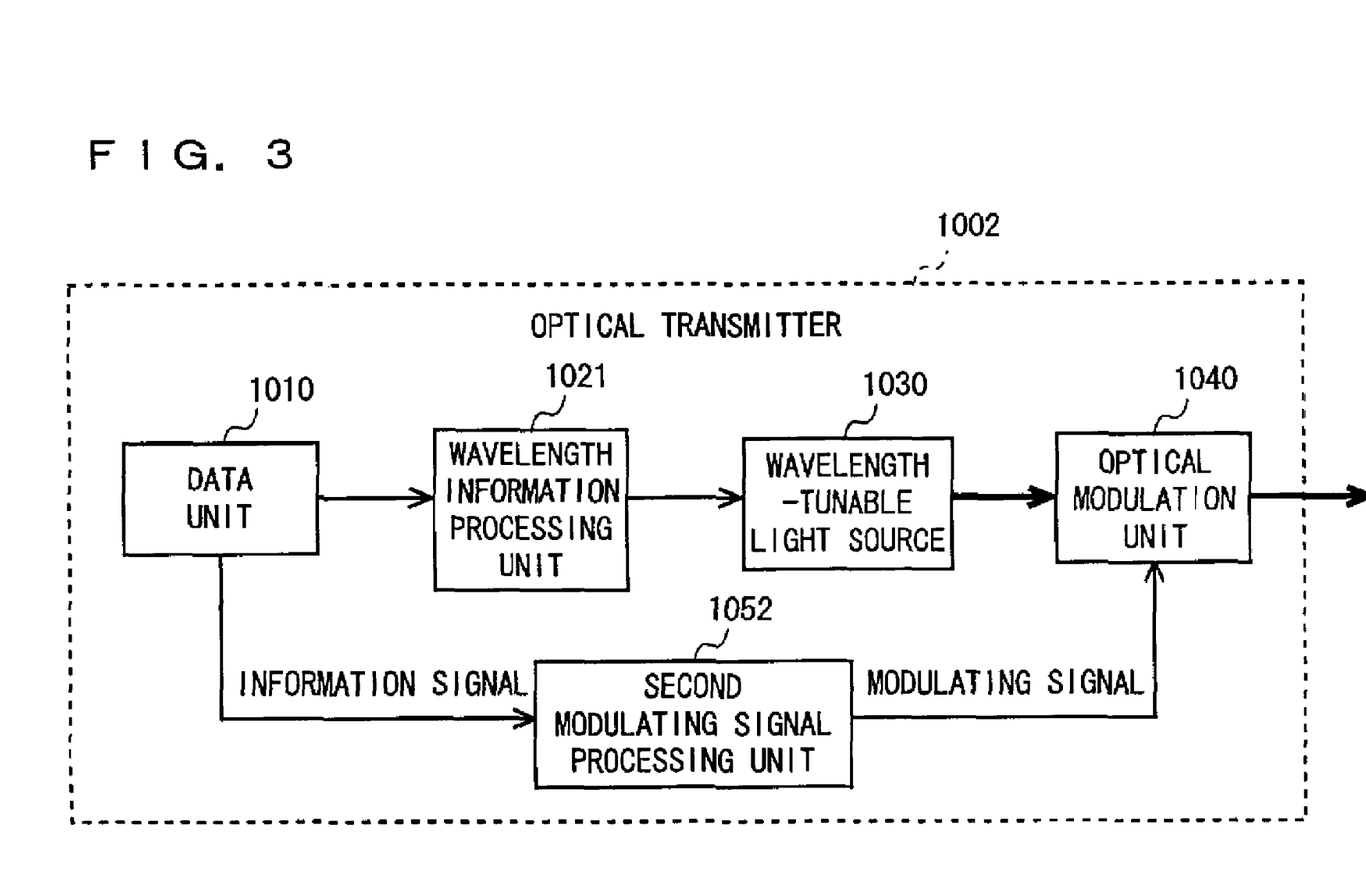
FIG. 3 is a block diagram illustrating the structure of an optical transmitter according to a second embodiment of the present invention.

FIG. 3 is a block diagram illustrating the structure of an optical transmitter 1002 according to a second embodiment of the present invention. In FIG. 3, the optical transmitter 1002 comprises a data unit 1010, a wavelength information processing unit 1021, a wavelength-tunable light source 1030, an optical modulation unit 1040, and a second modulating signal processing unit 1052. In FIG. 3, those component elements which have their counterparts in FIG. 1 will be denoted by the same reference numerals as those used therein, and the descriptions thereof will be omitted.

Figure 4:
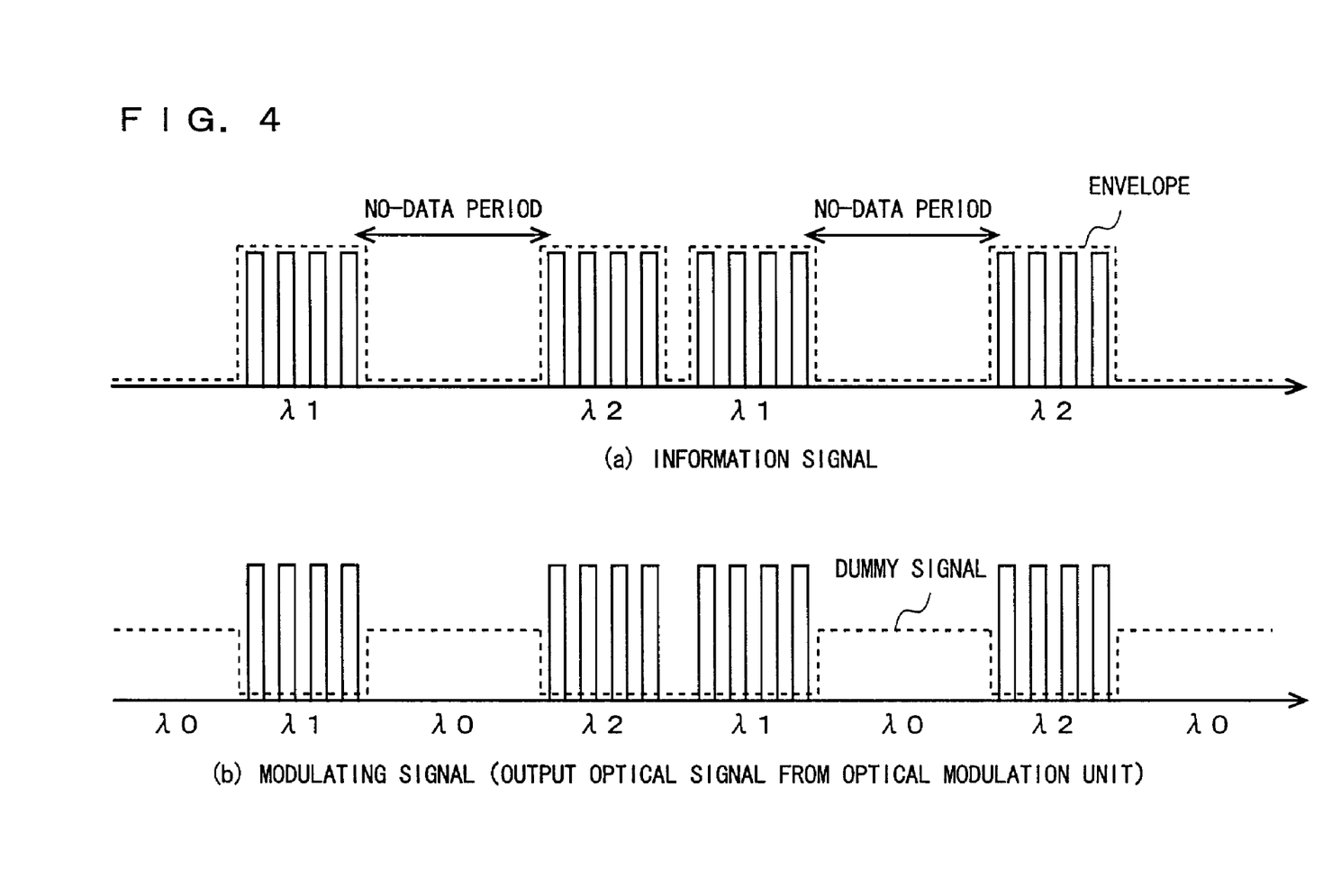
FIG. 4 is a diagram illustrating an information signal and a modulating signal according to the second embodiment of the present invention.

In (a) of FIG. 4 is shown an information signal outputted from the data unit 1010. In (b) of FIG. 4 is shown a modulating signal applied to the optical modulation unit 1040. Note that the output optical signal from the optical modulation unit 1040 will have the same waveform as that shown in (b) of FIG. 4. Hereinafter, the operation of the optical transmitter 1002 will be described with reference to FIGS. 3 and 4. Since the present embodiment is based on the first embodiment, only the differences therefrom will be described.

The second modulating signal processing unit 1052 receives an information signal outputted from the data unit 1010. The second modulating signal processing unit 1052 multiplexes a signal ("dummy signal") whose waveform is inverse to the envelope of the information signal (as shown in (b) of FIG. 4) with the information signal, and outputs the resultant signal as a modulating signal.

Thus, there is provided an optical transmitter in which a wavelength-tunable light source is controlled, by varying a wavelength controlling current applied thereto, so as to output light packets of different wavelengths in a time-divided manner (so that the wavelength will be different from optical packet to optical packet). In the optical transmitter according to the present embodiment, a signal whose envelope has an inverted polarity pattern of that of the information signal is multiplexed, such that the optical wavelength for any no-data period is selected to be a wavelength different from the wavelengths of all of the optical packets to be transmitted. As a result, it becomes possible to obtain a constant optical output power from the optical modulation unit, without affecting the information signal to be transmitted in the form of optical packets. Therefore, an optical surge can be prevented from occurring when an output optical signal from the optical modulation unit 1040 is transmitted through an optical transmission means which includes an optical amplifier.

Third Embodiment

Figure 5:
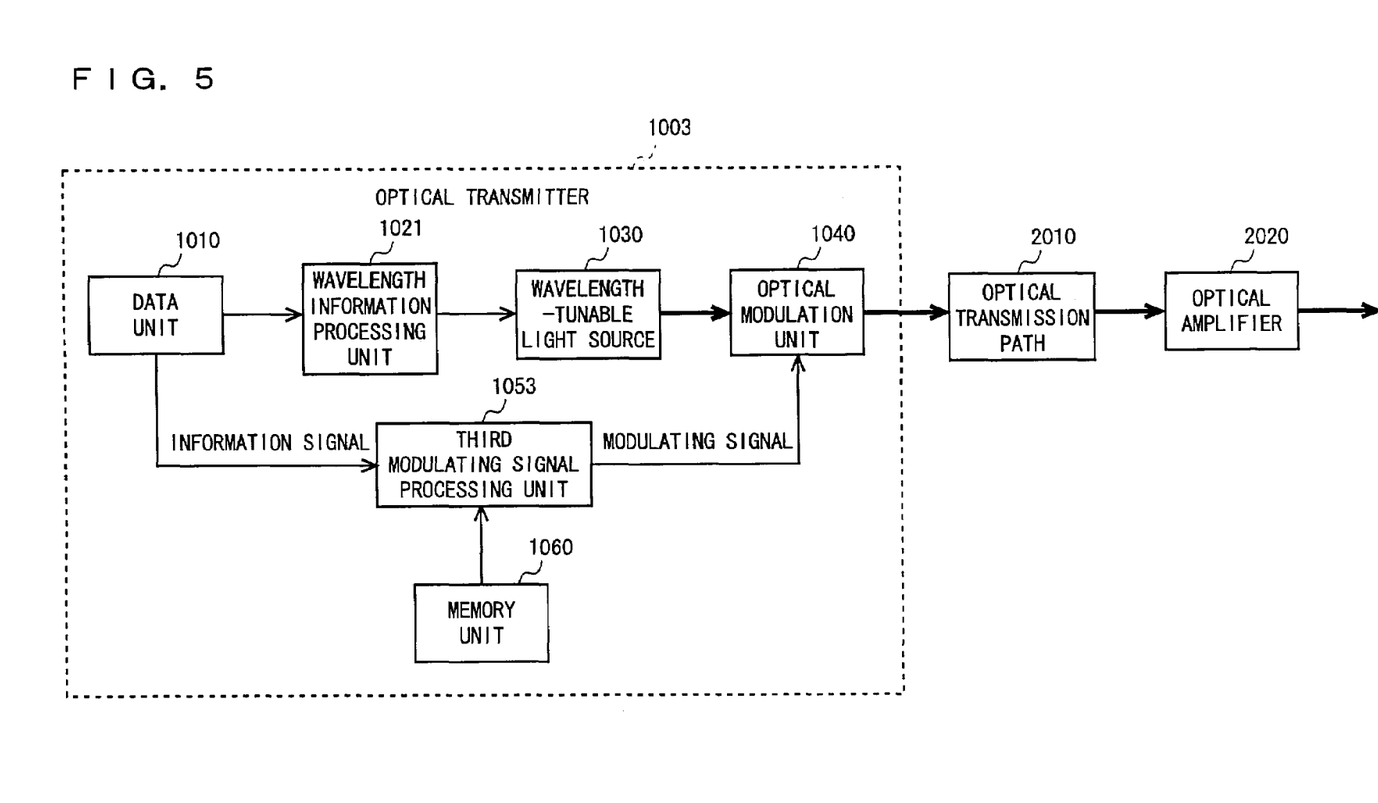
FIG. 5 is a block diagram illustrating the structure of an optical transmitter according to a third embodiment of the present invention.

FIG. 5 is a block diagram illustrating the structure of an optical transmitter 1003 according to a third embodiment of the present invention. In FIG. 5, the optical transmitter 1003 comprises a data unit 1010, a wavelength information processing unit 1021, a wavelength-tunable light source 1030, an optical modulation unit 1040, a third modulating signal processing unit 1053, and a memory unit 1060. At the output of the optical transmitter 1003, an optical amplifier 2020 is coupled via an optical transmission path 2010. In FIG. 5, those component elements which have their counterparts in FIG. 1 or FIG. 7 will be denoted by the same reference numerals as those used therein, and the descriptions thereof will be omitted.

Figure 6:
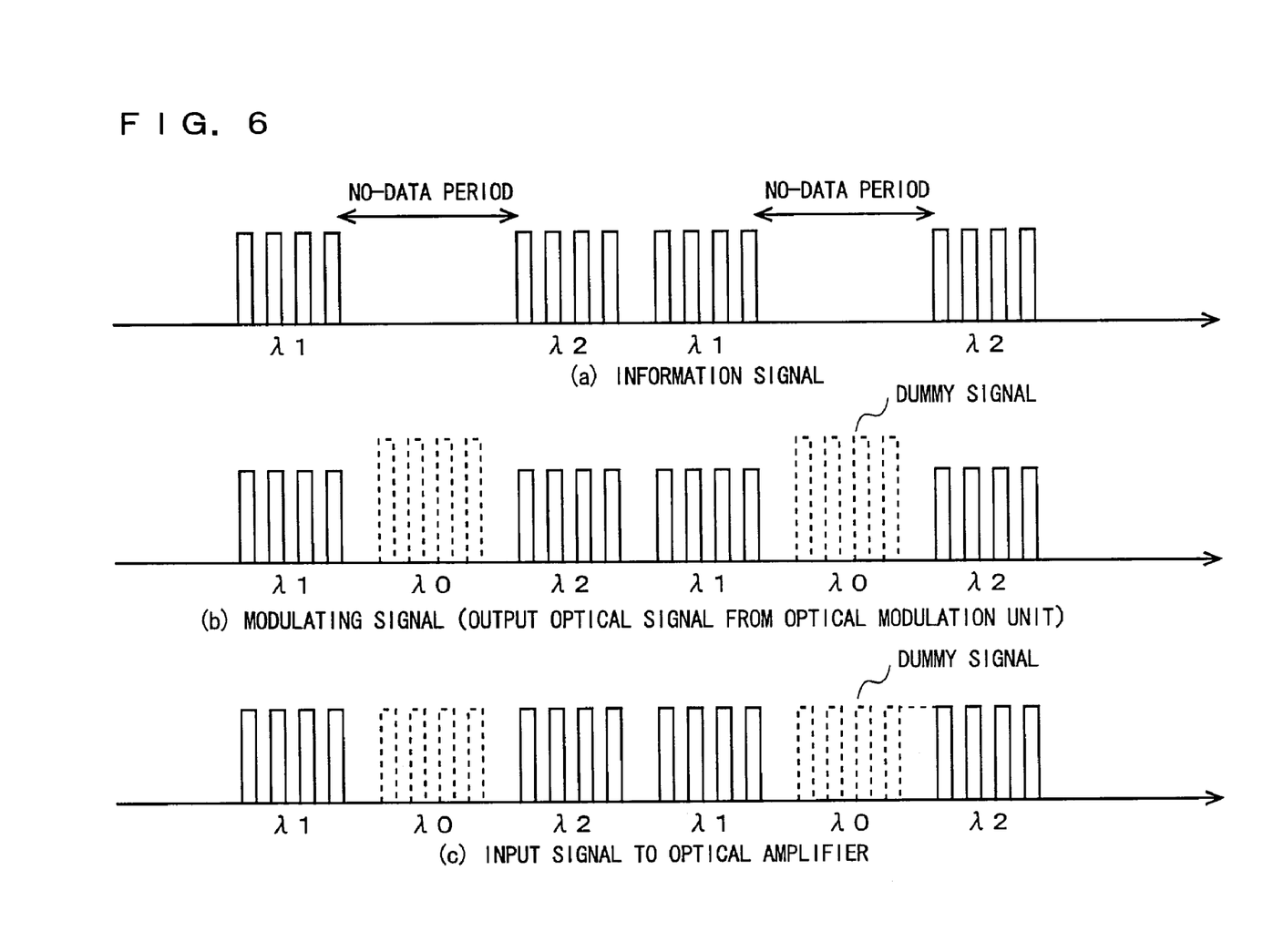
FIG. 6 is a diagram illustrating an information signal, a modulating signal, and an input signal to an optical amplifier according to the third embodiment of the present invention.

In (a) of FIG. 6 is shown an information signal outputted from the data unit 1010. In (b) of FIG. 6 is shown a modulating signal to be applied to the optical modulation unit 1040. Note that the output optical signal from the optical modulation unit 1040 will have the same waveform as that shown in (b) of FIG. 6. In (c) of FIG. 6 is shown an input signal to the optical amplifier 2020. Hereinafter, the operation of the optical transmitter 1003 will be described with reference to FIGS. 5 and 6. Since the present embodiment is based on the first embodiment, only the differences therefrom will be described.

The memory unit 1060 stores wavelength dependence of losses in the optical transmission path 2010. The third modulating signal processing unit 1053 receives the information signal outputted from the data unit 1010. Based on the information stored in the memory unit 1060, the third modulating signal processing unit 1053 controls the amplitude of an electric signal (dummy signal) to be inserted in no-data periods so that a constant input optical power to the optical amplifier 2020 is obtained, as shown in (b) of FIG. 6. As a result, even in a situation where the information signal and the dummy signal are susceptible to different amounts of loss after being outputted from the optical transmitter 1003 and before being inputted to the optical amplifier 2020, a constant input optical power to the optical amplifier 2020 is obtained as shown in (c) of FIG. 6, whereby optical surge is prevented.

In the case where a plurality of optical amplifiers are present, it is preferable to control the amplitude of the dummy signal so as to provide a constant input power for the last optical amplifier.

Similar effects will also be obtained by using a dummy signal as described in the second embodiment, i.e., a signal whose envelope has an inverted polarity pattern of that of the information signal.

Thus, there is provided an optical transmitter which outputs light packets of different wavelengths in a time-divided manner (so that the wavelength will be different from optical packet to optical packet). In the optical transmitter according to the present embodiment, an electric signal (dummy signal) is inserted in any no-data period, the amplitude of the dummy signal being controlled so as to provide a constant input optical power for the optical amplifier based on information concerning wavelength dependency (as a property of the optical transmission path). The optical wavelength for any no-data period is selected to be a wavelength different from the wavelengths of all of the optical packets to be transmitted. As a result, a constant input optical power to the optical amplifier is obtained, so that uniform transmission characteristics can be realized irrespective of the wavelength.

While the invention has been described in detail, the foregoing description is in all aspects illustrative and not restrictive. It is understood that numerous other modifications and variations can be devised without departing from the scope of the invention.

What is claimed is:

1. An optical transmitter for transmitting an information signal as a burst signal, comprising:
   a data unit for outputting the information signal and wavelength information representing a wavelength corresponding to the information signal;
   a modulating signal processing unit for receiving the information signal and outputting a modulating signal, the modulating signal comprising the information signal and a predetermined electric signal inserted in no-data periods, wherein the no-data periods are periods during which the information signal is absent;
   a wavelength information processing unit for receiving the wavelength information and outputting a wavelength controlling current, wherein the wavelength controlling current corresponds to the wavelength while the information signal is present, and corresponds to a predetermined wavelength during the no-data periods;
   a wavelength-tunable light source for outputting light whose wavelength corresponds to the wavelength controlling current; and
   an optical modulation unit for modulating the light outputted from the wavelength-tunable light source with the modulating signal.

2. The optical transmitter according to claim 1, wherein the predetermined electric signal inserted in the no-data periods by the modulating signal processing unit has an amplitude which is equal to an amplitude of the information signal outputted from the data unit.

3. The optical transmitter according to claim 1, wherein the predetermined electric signal inserted in the no-data periods by the modulating signal processing unit has an average electrical power which is equal to an average electrical power of the information signal outputted from the data unit.

4. The optical transmitter according to claim 1, wherein the modulating signal processing unit multiplexes the information signal outputted from the data unit with a signal whose waveform is inverse to an envelope of the information signal.

5. The optical transmitter according to claim 1, wherein the predetermined wavelength is different from the wavelength corresponding to the information signal.

6. The optical transmitter according to claim 1, wherein the modulating signal processing unit controls an amplitude of the predetermined electric signal inserted in the no-data periods so that a constant input optical power is obtained at an optical amplifier which receives the information signal.

7. The optical transmitter according to claim 1, wherein the modulating signal processing unit controls an average electrical power of the predetermined electric signal inserted in the no-data periods so that a constant input optical power is obtained at an optical amplifier which receives the information signal.

8. The optical transmitter according to claim 1, further comprising a memory unit storing wavelength dependence of losses in an optical transmission path extending from the optical transmitter to an optical amplifier which receives the information signal, wherein,
   based on the information stored in the memory unit, the modulating signal processing unit controls the predetermined electric signal inserted in the no-data periods so that a constant input optical power is obtained at the optical amplifier.

* * * * *